(12) United States Patent
Hattori

(10) Patent No.: US 10,072,725 B2
(45) Date of Patent: Sep. 11, 2018

(54) FLUID-FILLED TUBULAR VIBRATION-DAMPING DEVICE

(71) Applicant: SUMITOMO RIKO COMPANY LIMITED, Komaki-shi, Aichi (JP)

(72) Inventor: Masaya Hattori, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 20 days.

(21) Appl. No.: 15/468,901

(22) Filed: Mar. 24, 2017

(65) Prior Publication Data

US 2017/0284502 A1 Oct. 5, 2017

(30) Foreign Application Priority Data

Mar. 30, 2016 (JP) ................................. 2016-069517
Mar. 21, 2017 (JP) ................................. 2017-055030

(51) Int. Cl.
*F16F 13/10* (2006.01)
*B62D 33/06* (2006.01)
*F16F 15/02* (2006.01)

(52) U.S. Cl.
CPC ........ *F16F 13/107* (2013.01); *B62D 33/0604* (2013.01); *F16F 13/102* (2013.01); *F16F 15/022* (2013.01); *F16F 2222/12* (2013.01); *F16F 2224/025* (2013.01); *F16F 2230/0005* (2013.01); *F16F 2230/30* (2013.01)

(58) Field of Classification Search
CPC .......... F16F 13/10; F16F 13/14; F16F 13/105; F16F 13/107; F16F 13/102; F16F 15/022; F16F 2222/12; F16F 2224/025; F16F 2230/005; F16F 2230/30; B62D 33/0604; B60G 2204/41; B60K 5/12
USPC .......................................................... 267/293
See application file for complete search history.

(56) References Cited

U.S. PATENT DOCUMENTS

2004/0004317 A1* 1/2004 Hatano ................... F16F 13/16
267/140.12

FOREIGN PATENT DOCUMENTS

| JP | S64-35138 A | 2/1989 |
|----|-------------|--------|
| JP | S64-35139 A | 2/1989 |
| JP | H01-135940 A | 5/1989 |
| JP | H02-29899 B2 | 7/1990 |
| JP | H02-29900 B2 | 7/1990 |
| JP | H06-24595 Y | 6/1994 |

* cited by examiner

*Primary Examiner* — Melanie Torres Williams
(74) *Attorney, Agent, or Firm* — Oliff PLC

(57) ABSTRACT

A fluid-filled tubular vibration-damping device comprising: an inner shaft member and an outer tube member connected by a main rubber elastic body so as to provide a sealed zone filled with a non-compressible fluid therebetween; and a partition wall partitioning the sealed zone axially. An outer peripheral side of the partition wall is fixed to the outer tube member while an inner peripheral side of the partition wall is constituted by an annular partition wall rubber disposed around the inner shaft member in a movable manner axially. Sealing tube parts are integrally formed with an inner peripheral portion of the partition wall rubber and project toward axially opposite sides. Fitting parts thicker than the sealing tube parts are integrally formed with distal ends of the respective sealing tube parts and are externally fitted around the inner shaft member in a slidable manner.

9 Claims, 3 Drawing Sheets

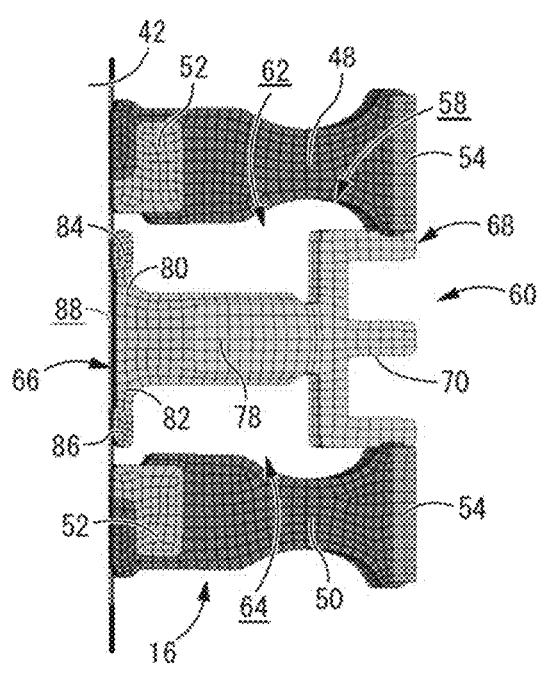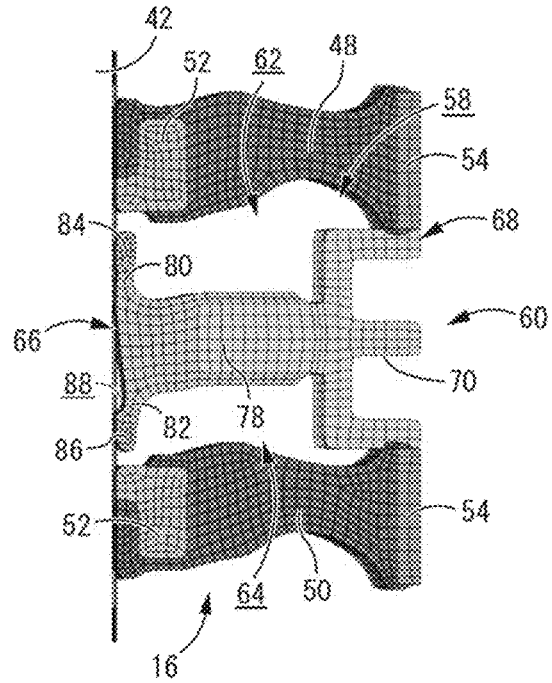

FLUID-FILLED TUBULAR VIBRATION-DAMPING DEVICE

INCORPORATED BY REFERENCE

The disclosures of Japanese Patent Application Nos. 2016-069517 filed on Mar. 30, 2016 and 2017-055030 filed on Mar. 21, 2017, each including the specification, drawings and abstract is incorporated herein by reference in its entirety.

BACKGROUND OF THE INVENTION

1. Field of the Invention

The present invention relates generally to a fluid-filled tubular vibration-damping device capable of obtaining vibration damping effect based on flow action of the fluid sealed inside. More particularly, the present invention pertains to a fluid-filled tubular vibration-damping device capable of obtaining vibration damping effect against vibration input in the axial direction.

2. Description of the Related Art

Conventionally, a tubular vibration-damping device of fluid-filled type has been used as a vibration damping linkage device, a vibration damping support device or the like mounted between components that make up a vibration transmission system in order to reduce vibration, which is disclosed in Japanese Patent Republication No. JP-B-H2-029899 etc., for example. The tubular vibration-damping device typically includes an inner shaft member and an outer tube member connected by a main rubber elastic body, two fluid chambers provided between the inner shaft member and the outer tube member, and an orifice passage interconnecting the two fluid chambers. During input of vibration, vibration damping effect will be exhibited based on flow action of the fluid induced to flow between the fluid chambers through the orifice passage.

Meanwhile, as disclosed in JP-B-H2-029899, for the tubular vibration-damping device, in order to obtain an excellent vibration damping effect against vibration input in the axial direction, suggested is a structure wherein a partition wall partitioning the two fluid chambers is provided in a movable manner in the axial direction with respect to the inner shaft member.

However, the structure disclosed in JP-B-H2-029899, wherein a resin sleeve bonded to the inner peripheral surface of a partition wall rubber is disposed externally around the inner shaft member in a slidable manner, is complicated and makes the manufacture difficult, since it is necessary to prepare the resin sleeve and bond it to the inner peripheral surface of the partition wall rubber elastic body. Moreover, through the gap between the resin sleeve and the inner shaft member, leakage of the fluid pressure or short-circuit of the fluid are likely to occur between the two fluid chambers, posing a problem of difficulty in obtaining a desired vibration damping ability with stability.

Besides, Japanese Unexamined Patent Publication No. JP-A-S64-035138 discloses a structure including thin, annular seals that project from axially opposite sides of the partition wall rubber so as to be convex peripherally inward in order to seal the gap between the partition wall rubber and the inner shaft member. However, the annular seal disclosed in JP-A-S64-035138 extends in the circumferential direction with an arcuate cross section whose middle portion in the direction of projection is made thick and is made thinner toward its distal end. Accordingly, the annular seal is in contact with the outer peripheral surface of the inner shaft member at the middle portion in the direction of projection whose diameter is the smallest, while its thin-walled distal end portion is remote from the inner shaft member so as to turn up.

Therefore, when the partition wall rubber moves in the axial direction of the inner shaft member, the fluid pressure will act on the inner peripheral surface side of the distal end portion of the annular seal, which is remote from the inner shaft member so as to turn up, so that the sealed state is likely to be broken by the fluid being led into the section where the annular seal is in contact with the inner shaft member. Since it is necessary to establish a large contact force of the annular seal with respect to the inner shaft member in order to maintain the sealed state, the movement resistance becomes large at the contact section of the annular seal with the inner shaft member. Thus, it becomes an issue to address the problems such as deterioration in vibration damping ability, deterioration in durability due to rubbing of the contact section, occurrence of sliding noises, or the like.

Moreover, due to the movement of the partition wall rubber in the axial direction of the inner shaft member during attachment or input of vibration, frictional resistance or fluid pressure will act on the thin-walled distal end portion of the annular seal so as to make it deform to the inner shaft member side, posing a risk that the distal end portion may be inserted further into the inner peripheral surface side of the partition wall rubber from the contact section of the annular seal with the inner shaft member, so as to be jammed between the partition wall rubber and the inner shaft member. Then, if the distal end portion of the annular seal is jammed between the partition wall rubber and the inner shaft member, the annular seal gets damaged and the desired vibration damping ability will not be exhibited, causing loss of product life.

SUMMARY OF THE INVENTION

It is therefore one object of this invention to provide a fluid-filled tubular vibration-damping device of novel structure which is able to obtain vibration damping effect based on fluid flow action against vibration input in the axial direction, and to ensure fluidtightness between the partition wall rubber and the inner shaft member while stably permitting relative movement of the partition wall rubber and the inner shaft member in the axial direction.

The above and/or optional objects of this invention may be attained according to at least one of the following modes of the invention. The following modes and/or elements employed in each mode of the invention may be adopted at any possible optional combinations.

A first mode of the present invention provides a fluid-filled tubular vibration-damping device comprising: an inner shaft member; an outer tube member; a main rubber elastic body that connects the inner shaft member and the outer tube member so as to provide a sealed zone filled with a non-compressible fluid between the inner shaft member and the outer tube member; a partition wall partitioning the sealed zone into axially opposite parts so as to provide two fluid chambers; and an orifice passage interconnecting the two fluid chambers, wherein an outer peripheral side of the partition wall is fixed to the outer tube member, an inner peripheral side of the partition wall is constituted by an annular partition wall rubber that is externally disposed around the inner shaft member in a movable manner in an axial direction, sealing tube parts are integrally formed with an inner peripheral portion of the partition wall rubber and project toward axially opposite sides, and fitting parts thicker than the sealing tube parts are integrally formed with projecting distal ends of the respective sealing tube parts and are externally fitted around the inner shaft member in a slidable manner.

The fluid-filled tubular vibration-damping device constructed according to the present mode is sealed in a state of contact at the thick-walled fitting parts provided at the distal end portions of the sealing tube parts with respect to the outer peripheral surface of the inner shaft member. Besides, the fitting parts are positioned at the distal end portions which are the farthest from the partition wall in the axial direction and made thick. Thus, when the partition wall is attached to the inner shaft member or when the partition wall moves relative to the inner shaft member in the axial direction as well, the axial distal end edges of the sealing tube parts are effectively prevented from being jammed between the partition wall and the inner shaft member.

Moreover, the middle portions of the sealing tube parts in the direction of projection are made thinner than the fitting part at the distal end. Thus, during input of vibration in the axial direction, that middle portions readily deform so as to be pressed against the inner shaft member due to the pressure generated in the fluid chamber on the positive pressure side when the partition wall displaces relative to the inner shaft member in the axial direction. Owing to such deformation of the sealing tube part, fluidtightness will be attained not only at the fitting part on the distal ends of the sealing tube parts but also at the middle portion of the sealing tube part in the direction of projection. This makes it possible to effectively prevent short-circuit between the fluid chambers through a gap between the partition wall and the inner shaft member without making the contact force of the fitting part with respect to the inner shaft member excessively large.

Therefore, it is also possible to realize the design for reducing sliding resistance between the partition wall including the sealing tube parts and the inner shaft member so as to achieve improvement in vibration damping effect owing to the flow action of the fluid exhibited based on the relative displacement of the inner shaft member and the outer tube member in the axial direction, decrease in occurrence of sliding noise, decrease in rubbing due to sliding, or the like.

A second mode of the present invention provides the fluid-filled tubular vibration-damping device according to the first mode, wherein a gap is provided between an inner peripheral surface of the sealing tube parts and the inner shaft member.

The fluid-filled tubular vibration-damping device of the present mode is able to reduce sliding resistance between the inner peripheral surface of the sealing tube part and the inner shaft member as well as to reduce occurrence of noise or rubbing due to the sliding. Moreover, since the sealing tube part is made thinner than the fitting part, when the partition wall displaces relative to the inner shaft member in the axial direction during vibration input in the axial direction and pressure fluctuations are induced in the fluid chamber, the sealing tube part is pressed against the inner shaft member due to the pressure in the fluid chamber on the positive pressure side. This will roughly dissipate the gap between the sealing tube part and the inner shaft member, thereby obtaining good sealing performance as well.

A third mode of the present invention provides the fluid-filled tubular vibration-damping device according to the first or second mode, wherein the partition wall before being externally disposed around the inner shaft member has such a shape in isolation that the sealing tube parts have a straight tube shape which extends in the axial direction with a generally unchanging transverse cross section, while projecting distal end edges of the sealing tube parts are made thicker toward the inner peripheral side so as to provide the fitting parts.

With the fluid-filled tubular vibration-damping device according to the present mode, since the initial shape of the sealing tube part is a straight tube shape, the design and manufacture become easy, as well as localized stress and concentration of deformation can be reduced or avoided.

A fourth mode of the present invention provides the fluid-filled tubular vibration-damping device according to any one of the first through third modes, wherein the inner peripheral portion of the partition wall rubber includes groove-shaped recess parts respectively extending on axially opposite surfaces in a circumferential direction on an outer peripheral side of projecting portions of the sealing tube parts which project toward the axially opposite sides.

With the fluid-filled tubular vibration-damping device according to the present mode, the partition wall rubber has a constricted shape due to the groove-shaped recess parts formed respectively on the axially opposite surfaces, so that elastic deformation at the constricted section is configured to be permitted relatively easily. Therefore, when the sealing tube parts, which project to the axially opposite sides from the section positioned on the inner peripheral side of the constricted section, are displaced relative to the inner shaft member in the axial direction, the entire partition wall rubber positioned on the inner peripheral side of the constricted section is likely to tilt in the axial direction due to the frictional resistance exerted on the sealing tube parts. As a result, the entire sealing tube parts undergo tilting deformation with respect to the inner shaft member, and the sealing tube part, which is positioned in the pressure-receiving chamber that is positioned in front in the direction of movement in the axial direction and where a positive pressure is induced, will be more effectively pressed against the inner shaft member, whereby sealing properties can be more improved.

A fifth mode of the present invention provides the fluid-filled tubular vibration-damping device according to any one of the first through fourth modes, wherein an annular orifice member is bonded to an outer peripheral side of the partition wall rubber while the annular orifice member is secured fitting into an inner peripheral surface of the outer tube member, and the orifice passage interconnecting the two fluid chambers is provided by utilizing the orifice member.

With the fluid-filled tubular vibration-damping device according to the present mode, the rigid orifice member is attached to the outer peripheral portion of the partition wall rubber. This will minimize the elastic deformation volume of the partition wall during vibration input in the axial direction, and more efficiently produce pressure fluctuations between the fluid chambers based on the piston action of the partition wall, thereby making it possible to improve vibration damping effect owing to increased amount of fluid flow. Besides, by forming the orifice passage in the outer peripheral portion of the partition wall where the peripheral length is large, a degree of freedom of designing the passage length of the orifice passage can be advantageously obtained.

A sixth mode of the present invention provides the fluid-filled tubular vibration-damping device according to the fifth mode, wherein the orifice member includes an inward convex portion projecting peripherally inward from an axially medial portion thereof, and the partition wall rubber is bonded to the inward convex portion.

With the fluid-filled tubular vibration-damping device according to the present mode, the inward convex portion of the orifice member bonded to the outer peripheral portion of the partition wall rubber largely ensures anchoring area of the partition wall rubber to the orifice member. In addition, since the inward convex portion restrains the partition wall rubber and minimizes its elastic deformation, the piston action of the partition wall during vibration input in the axial direction will be more improved.

A seventh mode of the present invention provides the fluid-filled tubular vibration-damping device according to any one of the first through sixth modes, wherein the sealing tube parts formed on the axially opposite sides of the partition wall rubber have shapes identical with each other.

With the fluid-filled tubular vibration-damping device according to the present mode, when vibration is input in the axial direction and the partition wall and the inner shaft member repeatedly undergo reciprocating displacement in the axial direction, the sealing tube parts on the axially opposite sides make it possible to realize roughly equal sealing properties, sliding properties, durability, or the like during displacement to either axial side.

An eighth mode of the present invention provides the fluid-filled tubular vibration-damping device according to any one of the first through seventh modes, wherein the two fluid chambers provided on the axially opposite sides of the partition wall comprise pressure-receiving chambers in which mutually opposite positive and negative pressure fluctuations are configured to arise by the partition wall being moved in the axial direction during relative movement of the inner shaft member and the outer tube member in the axial direction.

According to the present mode, the two fluid chambers are provided respectively on the opposite sides of the partition wall, where opposite positive and negative pressure fluctuations will actively arise during vibration input in the axial direction. This will realize the fluid-filled tubular vibration-damping device which is able to more actively ensure the amount of fluid flow owing to the piston action of the two fluid chambers.

A ninth mode of the present invention provides the fluid-filled tubular vibration-damping device according to any one of the first through seventh modes, wherein the fluid chamber provided on one axial side of the partition wall comprises a pressure-receiving chamber in which pressure fluctuations are configured to arise by the partition wall being moved in the axial direction during relative movement of the inner shaft member and the outer tube member in the axial direction, and the fluid chamber provided on another axial side of the partition wall comprises an equilibrium chamber whose wall portion is partially constituted by a flexible film such that pressure fluctuations are configured to be avoided during relative movement of the inner shaft member and the outer tube member in the axial direction.

According to the present mode, it is possible to obtain the fluid-filled tubular vibration-damping device in which, on the one side of the partition wall, provided is the fluid chamber where the positive and negative pressure fluctuations will actively and repeatedly arise during vibration input in the axial direction, and on the other side of the partition wall, provided is the fluid chamber where the pressure fluctuations will escape and be minimized due to deformation of the flexible film.

In the fluid-filled tubular vibration-damping device constructed according to the present invention, the thick-walled fitting part is provided at the distal end portion of each of the sealing tube parts projecting to the axially opposite sides from the inner peripheral portion of the partition wall rubber so as to realize the sealing structure between the partition wall and the inner shaft member. Thus, the sealing tube part is prevented from being jammed between the partition wall and the inner shaft member, thereby attaining stable sealing performance.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 3A and 3B are FEM analysis diagrams of the fluid-filled tubular vibration-damping device shown in FIG. 1, that is, FIG. 3A shows an FEM analysis in a normal state which vibration load is not input, and FIG. 3B shows an FEM analysis in a state which vibration load in an axial direction is input;

DETAILED DESCRIPTION OF PREFERRED EMBODIMENTS

Figure 1:
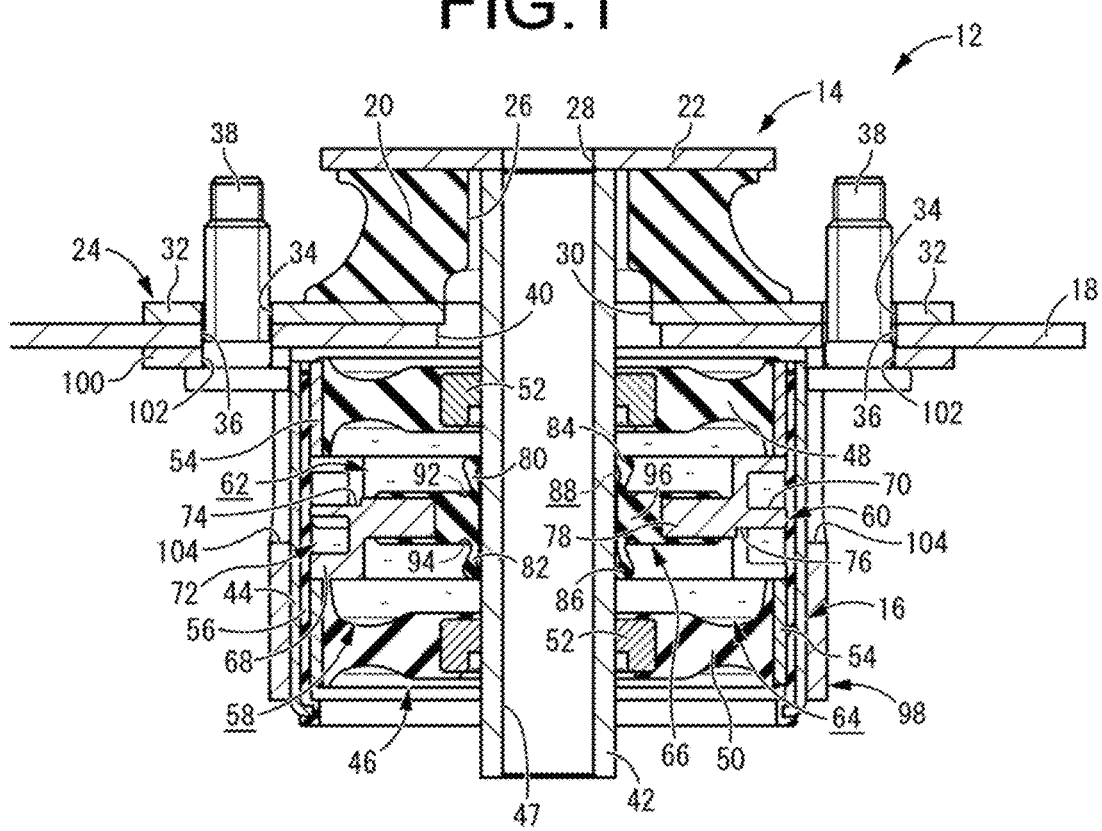
FIG. 1 is a longitudinal cross sectional view showing an automotive cab mount with a fluid-filled tubular vibration-damping device as a first embodiment of the present invention.

There will be described embodiments of the present invention while referring to the drawings.

FIG. 1 shows an automotive cab mount 12 with a fluid-filled tubular vibration-damping device constructed according to the present invention as a first embodiment of the present invention. The cab mount 12 of present embodiment comprises an upper mount 14 and a lower mount 16 combined with and attached to a vehicle body 18 on the upper and lower sides. The fluid-filled tubular vibration-damping device of the present invention comprises the lower mount 16. Besides, in the description hereafter, the up-down direction and the axial direction mean the up-down direction in FIG. 1, that is, a roughly up-down direction in a state being attached to a vehicle.

the upper mount 14 comprises an upper plate fitting 22 and an lower plate fitting 24, each of them being bonded to the upper and lower faces of a connecting rubber elastic body 20 respectively in a superposed state.

The connecting rubber elastic body 20 has a borehole 26 penetrating the central axis thereof and a tapered outer peripheral surface gradually decreasing the diameter as it goes upward. The upper and the lower plate fittings 22, 24 are annular shaped with the respective center holes 28, 30, each of the center holes 28, 30 communicating with the borehole 26 of the connecting rubber elastic body 20.

The center hole 28 of the upper plate fitting 22 is smaller in diameter than both of the center hole 30 of the lower plate fitting 24 and the borehole 26 of the connecting rubber elastic body 20. The lower plate fitting 24 has a plurality of holding parts 32 expanding peripherally outward, and each of the holding parts 32 has a bolt mounting hole 34.

The upper mount 14 is configured to be mounted on the upper surface of the mounting portion of the vehicle body 18 in a superposed state. A plurality of bolt mounting holes 36 are formed in the mounting portion of the vehicle body 18. Fastening bolts 38 are attached to each of the bolt mounting holes 36 and are inserted into each of the bolt mounting holes 34 of the lower plate fitting 24, so that the lower plate fitting 24 is configured to be attached to the vehicle body 18 by fixing.

A mounting hole 40 is formed in the mounting portion of the vehicle body 18 with the size roughly same as the center hole 30 of the lower plate fitting 24. The center hole 28 of the upper plate fitting 22 and the center hole 30 of the lower plate fitting 24 of the upper mount 14 and the borehole 26 of the connecting rubber elastic body 20 are in a communicating state opening downward of the vehicle body 18 through the mounting hole 40.

Meanwhile, the lower mount 16 comprises an inner shaft member 42 of metal and an outer tube member 44 of metal disposed roughly coaxially with a prescribed distance in the circumferential direction, each of the inner shaft member 42 and the outer tube member 44 being elastically connected by a main rubber elastic body 46.

The inner shaft member 42 is small-diameter tube shaped figure extending in the up-down direction straightly, having a borehole 47 extending in the up-down direction straightly at the center. In the present embodiment, especially, the inner shaft member 42 has the inner diameter roughly same as that of the center hole 28 of the upper plate fitting 22 and has the outer diameter smaller than the inner diameters of both of the borehole 26 of the connecting rubber elastic body 20 of the upper mount 14 and the center hole 30 of the lower plate fitting 24.

An upper rubber elastic body 48 and a lower rubber elastic body 50 are provided between radially opposed faces of the inner shaft member 42 and the outer tube member 44 on axially upper and lower sides respectively. The upper and lower rubber elastic bodies 48, 50 have the roughly same structure and connect the inner shaft member 42 and the outer tube member 44 elastically on the axially upper and lower sides. The upper and lower rubber elastic bodies 48, 50 constitute the main rubber elastic body 46.

The upper and lower rubber elastic bodies 48, 50 are thick-walled and roughly annular shaped with an inner mating fitting 52 bonded by vulcanization on the inner peripheral surface and an outer mating fitting 54 bonded by vulcanization on the outer peripheral surface. The inner mating fitting 52 is fastened externally onto the inner shaft member 42, whereas the outer mating fitting 54 is fastened internally onto the outer tube member 44.

A seal lip is provided on the inner surface of the inner mating fitting 52 and seals the fitting surface to the inner shaft member 42. Likewise, a seal rubber layer 56 is formed so as to cover the inner peripheral surface of the outer tube member 44 and seals the fitting surface of the outer mating fitting 54 to the outer tube member 44.

A fluid sealing zone 58 serving as a sealed zone is provided between opposite faces of the inner shaft member 42 and the outer tube member 44 in the radial direction, the fluid sealing zone 58 being isolated from the outer space and filled with non-compressible fluid and disposed between the axially opposite upper and lower rubber elastic bodies 48, 50. Besides, the sealed fluid or liquid in the present embodiment is desirably a low-viscosity fluid such as water and alkylene glycol considering spring characteristics based on a resonating action of the fluid.

A partition wall 60 is provided between opposite faces of the upper and lower rubber elastic bodies 48, 50 in the axial direction. The partition wall 60 has an entirely annular shape and bridges radially between the inner shaft member 42 and the outer tube member 44 within the fluid sealing zone 58.

The partition wall 60 is situated in opposition to the upper and lower rubber elastic bodies 48, 50 with the roughly same distance in the axial direction. The fluid sealing zone 58 is partitioned by the partition wall 60 disposed at roughly medial portion in the up-down direction. An upper fluid chamber 62 whose wall partly comprises the upper rubber elastic body 48 is formed above the partition wall 60. A lower fluid chamber 64 whose wall partly comprises the lower rubber elastic body 50 is formed below the partition wall 60.

An annular shaped partition wall rubber 66 constitutes the inner peripheral portion of the partition wall 60. An annular shaped orifice member 68 is bonded to the outer peripheral portion of the partition wall 60. In the present embodiment, the partition wall rubber 66 is an integrally vulcanization molded component with the orifice member 68.

The orifice member 68 is formed by rigid material such as synthetic resin and aluminum alloy, and has a groove 70 extending in a circumferential direction on the outer peripheral surface. In the present embodiment, the groove 70 extends roughly helically for a length equal to once around or more in the circumferential direction.

The outer peripheral surface of the orifice member 68 is secured fitting into the inner peripheral surface of the outer tube member 44. The outer peripheral surface of the orifice member 68 has a larger axial dimension than the partition wall rubber 66 and is positioned axially by being sandwiched by the outer mating fittings 54, 54 of the upper and lower rubber elastic bodies 48, 50.

The outer tube member 44 fitted externally onto the orifice member 68 covers the groove 70 of the orifice member 68, so that an orifice passage 72 is formed so as to extend in the circumferential direction along the inner peripheral surface of the outer tube member 44. An end of the orifice passage 72 in the length direction opens to the upper fluid chamber 62 through a communicating hole 74 and the other end of the orifice passage 72 in the length direction opens to the lower fluid chamber 64 through a communicating hole 76. Due to the structure, the upper and lower fluid chambers 62, 64 are interconnected through the orifice passage 72.

Furthermore, an inward convex portion 78 projecting peripherally inward is provided in the axial medial portion of the orifice member 68. In the present embodiment, the inward convex portion 78 is annular-plate shaped and extends along the entire circumferential length of the orifice member 68. The outer peripheral portion of the partition wall rubber 66 is bonded to the inner peripheral end portion of the inward convex portion 78 with a smaller axial dimension than the outer peripheral portion of the orifice member 68.

The partition wall rubber 66 has the wall thickness roughly same as the inward convex portion 78 and an annular shape extending on the outer peripheral surface of the inner shaft member 42. The partition wall rubber 66 is disposed between opposite faces of the inner shaft member 42 and the orifice member 68 in the radial direction, and permits the relative displacement of the inner shaft member 42 and the outer tube member 44 by elastic deformation. Additionally, the partition wall rubber 66 is not adhered to the inner shaft member 42, so that the relative movement of the partition wall 60 with respect to the inner shaft member 42 is permitted while the fluidtightness between opposite faces of the inner shaft member 42 and the orifice member 68 in the radial direction is maintained.

Namely, the inner peripheral surface of the partition wall rubber 66 has an inside diameter dimension which is roughly same as or a little larger than the outer diameter of the inner shaft member 42, and is not adhered to the outer peripheral surface of the inner shaft member 42 so as to be movable in the axial direction.

Figure 2:
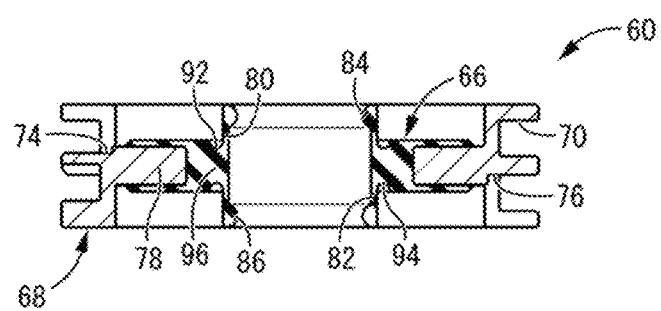
FIG. 2 is a longitudinal cross sectional view showing in isolation a partition wall composing the fluid-filled tubular vibration-damping device shown in FIG. 1.

As shown in FIG. 2, an upper sealing tube part 80 and a lower sealing tube part 82 are formed in the partition wall rubber 66 integrally, each of the tube parts projecting coaxially in the axially opposite directions from the inner peripheral end of the partition wall rubber 66. In the present embodiment, the upper and lower sealing tube parts 80, 82 have shapes identical with each other.

The upper and lower sealing tube parts 80, 82 have a circular tube shape with a generally unchanging transverse cross section projecting straight in the axial direction with the inner diameter dimension roughly same as the inner diameter of the partition wall rubber 66, in the isolated state before being externally disposed around the inner shaft member 42 as shown in FIG. 2, that is, a thin tubular wall structure so as to permit elastic deformation. The wall thickness of the tubular wall is set as appropriate considering the adoptable rubber material, its size, fluid pressure arising during input vibration and demanded durability, not particularly limited. Generally, the wall thickness not greater than 3 mm is preferable, and more preferably adopted is approximately from 0.3 to 2 mm wall thickness.

Furthermore, the peripheral edge of the opening of the projecting distal ends of the sealing tube parts 80, 82 have a larger wall thickness about the entire circumference, forming an annular upper fitting part 84 and a lower fitting part 86 respectively. In the present embodiment especially, the projecting distal end edges of the upper and lower sealing tube parts 80, 82 have a smaller inner diameter so as to be thick inward, thereby forming the upper and lower fitting parts 84, 86. Namely, with regard to the partition wall rubber 66 with the upper and lower sealing tube parts 80, 82, the fitting parts 84, 86 have smallest inner diameter. Besides, the inner diameter of fitting parts 84, 86 is set smaller than the outer diameter of the inner shaft member 42.

Consequently, as shown in FIG. 1, in an attached state wherein the partition wall 60 is externally fitted around the inner shaft member 42, the inner peripheral surfaces of the upper and lower fitting parts 84, 86 are abutted to the outer peripheral surface of the inner shaft member 42 about the entire circumference in a pressed and sealed state. When the vibration in the axial direction is input, the upper and lower fitting parts 84, 86 externally fitted around the inner shaft member 42 are slidable on the inner shaft member 42.

Furthermore, since the upper and lower fitting parts 84, 86 have the diameter enlarged by the inner shaft member 42, the upper and lower sealing tube parts 80, 82 are also pushed to be enlarged so as to induce curving deformation. At least the ends of the side of the upper and lower fitting parts 84, 86 of the upper and lower sealing tube parts 80, 82, the upper and lower sealing tube parts 80, 82 are apart from the outer peripheral surface of the inner shaft member 42 to the extent approximately corresponding to the projecting length of the upper and lower fitting parts 84, 86 toward the inner peripheral surface of the upper and lower sealing tube parts 80, 82, thereby providing a radial gap 88 between the upper and lower sealing tube parts 80, 82 and the inner shaft member 42. In the present embodiment, the partition wall rubber 66 has the inner diameter a little larger than the outer peripheral surface of the inner shaft member 42, so that the gaps between the upper and lower sealing tube parts 80, 82 and the inner shaft member 42 are interconnected through another gap between the inner peripheral surface of the partition wall rubber 66 and the outer peripheral surface of the inner shaft member 42, thereby providing the united gap 88.

Moreover, on the upper and lower opposite surfaces in the thickness direction of the partition wall rubber 66 in the inner peripheral portion of the partition wall rubber 66, upper and lower recess parts 92, 94 are respectively formed extending on the outer peripheral side of basal ends of the upper and lower sealing tube parts 80, 82 in the circumferential direction. Due to formation of the upper and lower recess parts 92, 94, the thickness dimension of the partition wall rubber 66 is small on the outer peripheral side of the projecting portions of the upper and lower sealing tube parts 80, 82.

That is, a constricted section 96 is formed in the radially medial portion of the partition wall rubber 66, the constricted section 96 being made thin by the upper and lower recess parts 92, 94 so as to have smaller curving deformation rigidity in the axial direction. The radially inner portion positioned inside of the constricted section 96 containing the upper and lower sealing tube parts 80, 82 is capable of inducing elastic deformation in the axial direction in a swinging manner. In the present embodiment, each of the upper and lower recess parts 92, 94 is annular groove shaped and extends continuously in the circumferential direction.

The lower mount 16 is partitioned by the partition wall 60 of such a structure, thereby forming the upper and lower fluid chambers 62, 64, and the lower mount 16 is attached to the lower surface of the mounting portion of the vehicle body 18 in a state of being superposed by the vehicle body 18.

The inner shaft member 42 of the lower mount 16 extends axially upward from the outer tube member 44, and projects upward through the mounting hole 40 formed at the mounting portion of the vehicle body 18. The upper mount 14 is attached to the mounting portion of the vehicle body 18 from above and the inner shaft member 42 is inserted into the upper mount 14 from below, so that the upper end of the inner shaft member 42 is superposed by the inner peripheral edge of the upper plate fitting 22 of the upper mount 14.

The upper plate fitting 22 of the upper mount 14 and the inner shaft member 42 of the lower mount 16 are configured to be installed to the automotive cab housing with a fixing bolt inserted through the center hole 28 of the upper plate fitting 22 and the borehole 47 of the inner shaft member 42. In this installed state, the upper plate fitting 22 of the upper mount 14 and the inner shaft member 42 of the lower mount 16 are fastened and fixed by fastening force of the fixing bolt so as to be united to each other.

Prescribed gaps are provided between the outer periphery of the inner shaft member 42 and the borehole 26 of the connecting rubber elastic body 20 of the upper mount 14, the inner peripheral surface of the center hole 30 of the lower plate fitting 24 and the inner peripheral surface of the mounting hole 40 of the vehicle body 18. Owing to the gaps, interference of the inner shaft member 42 with the connecting rubber elastic body 20, the lower plate fitting 24, the vehicle body 18, or the like is reduced or avoided during input of vibration load.

On the other hand, the outer tube member 44 of the lower mount 16 is attached to the vehicle body 18 by fixing via an outer bracket 98.

The outer bracket 98 has a large-diameter circular tube shape and is configured to press-fit-fasten the outer tube member 44 of the lower mount 16. Besides, a flange 100 expanding peripherally outward is integrally formed on the edge of the axially upside opening of the outer bracket 98. A plurality of bolt inserting holes 102 are provided in the flange 100.

Each of bolt inserting holes 102 is aligned with the bolt mounting hole 36 of the vehicle body 18 and the bolt mounting hole 34 of the lower plate fitting 24 of the upper mount 14, so as to be fastened and fixed one another by the fastening bolts 38 each inserted through the bolt inserting hole 102 and the bolt mounting holes 36, 34. Besides, on the peripheral wall of the outer bracket 98, windows 104 are provided on the circumferential portions corresponding to each of the bolt inserting holes 102, so that the heads of fastening bolts 38 don't interfere with the peripheral wall of the outer bracket 98.

In this way, according to the cab mount 12 of the present embodiment with the above-mentioned structures, against support load in the axial direction, prescribed elastic support capacity is exhibited mainly by compressive deformation of the connecting rubber elastic body 20 of the upper mount 14. Meanwhile, against support load in the axial-perpendicular direction, prescribed elastic support capacity is exhibited by shear deformation of the connecting rubber elastic body 20 of the upper mount 14 and compressive deformation of the upper and lower rubber elastic bodies 48, 50 and the partition wall rubber 66 of the lower mount 16.

In addition, during vibration load in the axial direction is input between the inner shaft member 42 and the outer tube member 44, prescribed vibration damping effect is exhibited based on the fluid flow action through the orifice passage 72 arising between the upper and lower fluid chambers 62, 64 in the lower mount 16.

At this time, the upper and lower rubber elastic bodies 48, 50 comprising the outer walls of the upper and lower fluid chambers 62, 64 respectively are attached to the inner shaft member 42 and the outer tube member 44 respectively at their inner periphery and outer periphery and undergo shear deformation in the roughly same direction. On the other hand, the partition wall 60 has the orifice member 68 on the outer peripheral portion attached to the outer tube member 44 and the partition wall rubber 66 on the inner peripheral portion non-attached to the inner shaft member 42, so that when outer tube member 44 displaces relative to the inner shaft member 42 in the axial direction, the partition wall 60 also moves relative to the inner shaft member 42 in the axial direction.

Consequently, the partition wall 60 undergoes relative reciprocating displacement in the direction of approach/separation with respect to the upper and lower rubber elastic bodies 48, 50, synchronizing with the vibration input in the axial direction, thereby inducing relative pressure fluctuations of the upper and lower fluid chambers 62, 64. Based on the pressure fluctuations, fluid flow is produced through the orifice passage 72 between the upper and lower fluid chambers 62, 64, thereby vibration damping effect is exhibited based on flow behavior such as liquid resonance action.

In the present embodiment especially, each of the upper and lower fluid chambers 62, 64 does not have a readily deformable flexible wall. Each of the upper and lower fluid chambers 62, 64 is a pressure-receiving chamber in which mutually opposite positive and negative pressure fluctuations are configured to arise when the partition wall 60 displaces in the direction of approach/separation with respect to the upper and lower rubber elastic bodies 48, 50. Therefore, it is possible to greatly ensure hydraulic head pressure of the fluid flowing through the orifice passage 72 and hence amount of fluid flow actively during vibration input.

Moreover, between the partition wall rubber 66 and the inner shaft member 42, the thick-walled upper and lower fitting parts 84, 86 ensure the sealing properties, the upper and lower fitting parts 84, 86 being provided at respective distal end of the upper and lower sealing tube parts 80, 82 which project toward the axially opposite directions from the inner peripheral portions of the partition wall rubber 66. Therefore, short-circuit interconnection between the upper and lower fluid chambers 62, 64 during vibration input is prevented, whereby amount of fluid flow through the orifice passage 72 is stably ensured.

Especially, since the upper and lower fitting parts 84, 86 which function as a sealing portion are provided apart from the partition wall rubber 66 on axially opposite sides, it is not necessary to press hard the main body of the partition wall rubber 66 against the outer peripheral portion of the inner shaft member 42 in order to ensure sealing performance. Therefore, when a load in the axial-perpendicular direction is input, any adverse effect of large spring rigidity of the partition wall rubber 66 with a small radial dimension is effectively avoided. Furthermore, since the thick-walled upper and lower fitting parts 84, 86 are provided at the projecting distal ends of the upper and lower sealing tube parts 80, 82 respectively, when the partition wall 60 is attached to the inner shaft member 42 or when the partition wall 60 moves relative to the inner shaft member 42 in the axial direction as well, the axial distal end edges of the upper and lower sealing tube parts 80, 82 are effectively prevented from being jammed, thereby exhibiting stable sealing performance. In addition, since sliding-contact resistance between the partition wall rubber 66 and the inner shaft member 42 is reduced, the axial spring characteristics are enhanced, noise is prevented and reduction of durability caused by rubbing of sliding-contact portion is eliminated.

Furthermore, the upper and lower sealing tube parts 80, 82 are provided between the partition wall rubber 66 and the upper and lower fitting parts 84, 86 so as to cover the inner shaft member 42. Since the upper and lower sealing tube parts 80, 82 are thin enough to deform easily, when an vibration in the axial direction is input and positive pressure induced in one of the upper and lower fluid chambers 62 (64) is acted on the outer peripheral surface of the corresponding upper (lower) sealing tube part 80 (82), the upper (lower) sealing tube part 80 (82) elastically deforms peripherally inward to be pressed against the outer peripheral surface of the inner shaft member 42. Consequently, by utilizing the pressure of the fluid chambers, short-circuit of the upper and lower fluid chambers 62, 64 through a gap between the upper and lower sealing tube parts 80, 82 and the inner shaft member 42 is prevented even more effectively.

Especially, the partition wall rubber 66 and the upper and lower sealing tube parts 80, 82 tend to tilt entirely backward of the direction of movement based on frictional resistance or fluid pressure to the peripheral surface of the inner shaft member 42 during moving relative to the inner shaft member 42 in the axial direction. Consequently, one of the upper and lower sealing tube parts 80, 82 extending forward of the direction of movement is likely to be pressed against the outer peripheral surface of the inner shaft member 42, thereby ensuring the desired sealing properties even more efficiently.

In the present embodiment especially, owing to the constricted section 96 formed in the radially medial portion of the partition wall rubber 66, the inner peripheral portion forming the upper and lower sealing tube parts 80, 82 is likely to tilt by inducing elastic deformation in the axial direction in a swinging manner.

Incidentally, FIGS. 3A and 3B show the result of numerical analysis by a Finite Element Method (FEM) of the walls of the upper rubber elastic body 48, the lower rubber elastic body 50 and the partition wall rubber 66 of the lower mount 16 during vibration input in the axial direction. FIG. 3A shows a normal state without any vibration input. Meanwhile, FIG. 3B shows a state wherein the partition wall 60 is moved relative to the inner shaft member 42, upward in the figure, by vibration input in the axial direction. In FIG. 3B, the inner peripheral portion of the partition wall rubber 66 deforms downward, that is, backward of the direction of movement of the partition wall 60 in a swinging manner, so that the upper sealing tube part 80 is pressed against the outer peripheral surface of the inner shaft member 42 in the forward side of the direction of movement of the partition wall 60.

In FIG. 3B, positive pressure arises in the upper fluid chamber 62 so that the upper sealing tube part 80 is pressed against the outer peripheral surface of the inner shaft member 42. Meanwhile, negative pressure occurs in the lower fluid chamber 64. At this time, the lower fitting part 86 can be apart from the outer peripheral surface of the inner shaft member 42.

Sealing performance is configured to be enhanced by utilizing the elastic deformation of the upper and lower sealing tube parts 80, 82 due to fluid pressure, so that it not necessary to excessively increase the fitting force between the upper and lower fitting parts 84, 86 and the inner shaft member 42 in order to ensure the desired sealing performance between the partition wall 60 and the inner shaft member 42. Therefore, it is possible to decrease fitting force of the upper and lower fitting parts 84, 86 with the inner shaft member 42 so as to reduce the noise or rubbing due to sliding of the upper and lower fitting parts 84, 86, as well as to ensure fluidtightness between the partition wall rubber 66 and the inner shaft member 42.

Figure 4:
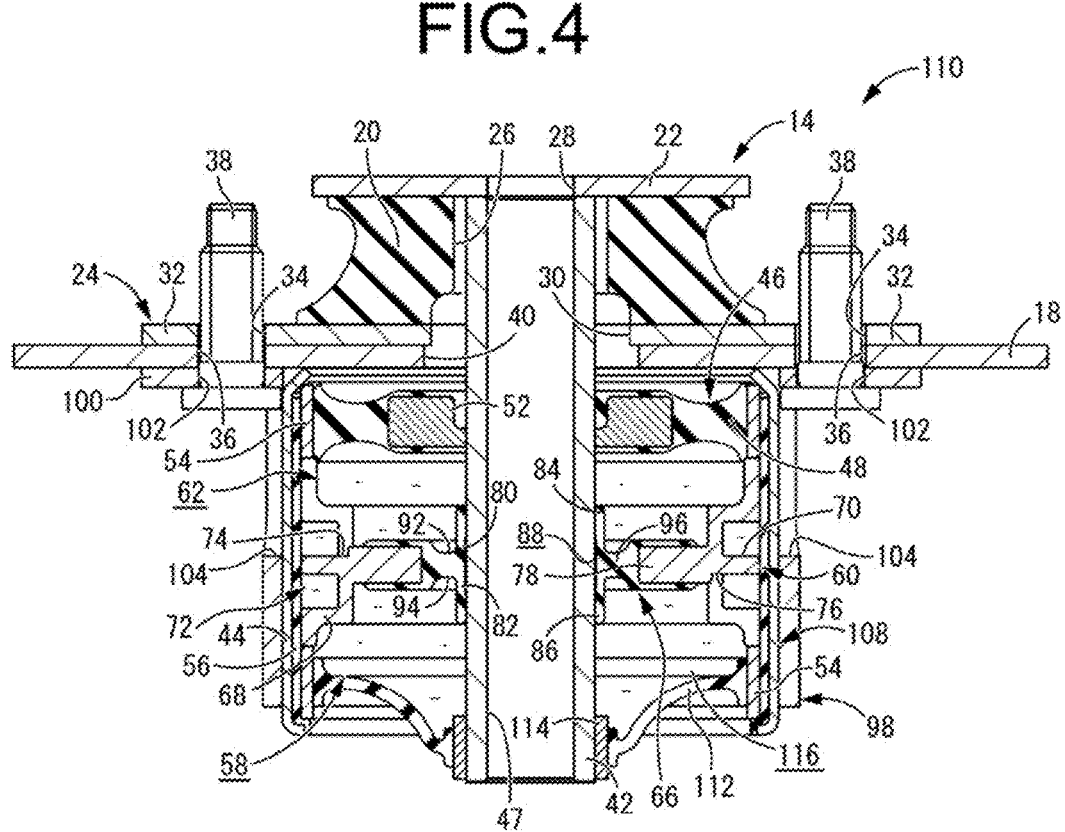
FIG. 4 is a longitudinal cross sectional view showing an automotive cab mount with a fluid-filled tubular vibration-damping device as a second embodiment of the present invention.

Next, FIG. 4 shows an automotive cab mount 110 with the fluid-filled tubular vibration-damping device (lower mount) 108 constructed according to the present invention as a second embodiment of the present invention. In the preceding first embodiment, the upper and lower rubber elastic bodies (48, 50) with the roughly same structure are provided, and when vibration is input in the axial direction, the upper fluid chamber (62) whose wall partly comprises the upper rubber elastic body (48) and the lower fluid chamber (64) whose wall partly comprises the lower rubber elastic body (50) are both pressure-receiving chambers in which mutually opposite positive and negative pressure fluctuations are configured to arise. Meanwhile, in the present embodiment, the upper and lower rubber elastic bodies have different structure from each other. Besides, in the description hereafter, components and parts that are substantially identical with those in the preceding embodiment will be assigned the symbols identical with those in the figure and not described in any detail.

Namely, in the present embodiment, the lower rubber elastic body is thinner than the upper rubber elastic body so as to be a flexible film 112 which induces flexural deformation inward and outward in the axial direction comparatively easily. In addition, in the longitudinal cross sectional view of FIG. 4, the flexible film 112 has an arcuate cross section curving inward (upward), so that degree of freedom of deformation and level of allowable deformation inward and outward of the flexible film 112 can be enhanced.

Furthermore, the outer mating fitting 54 is bonded to the outer peripheral surface of the flexible film 112 by vulcanization. Meanwhile, an inner mating fitting 114 with a roughly tube shape or a roughly annular shape is bonded to the inner peripheral surface of the flexible film 112 by vulcanization. The inner mating fitting 114 is fastened externally onto the inner shaft member 42, whereas the outer mating fitting 54 is fastened internally onto the outer tube member 44. Accordingly, the flexible film 112 is attached to the lower opening of the outer tube member 44. Besides, the upper rubber elastic body 48 in the present embodiment has the structure same as that of the preceding first embodiment, that is, the main rubber elastic body 46 comprises the upper rubber elastic body 48.

Also in the present embodiment, the fluid sealing zone 58 is provided between the axially opposite upper rubber elastic body 48 and the lower rubber elastic body (flexible film) 112. The fluid sealing zone 58 is partitioned by the partition wall 60 with the structure same as that of the preceding first embodiment. Accordingly, the upper fluid chamber 62 whose wall portion is partially constituted by the upper rubber elastic body 48 serving as the pressure-receiving chamber is formed above the partition wall 60, whereas a lower fluid chamber 116 whose wall portion is partially constituted by the lower rubber elastic body (flexible film) 112 is formed below the partition wall 60. The upper fluid chamber 62 and the lower fluid chamber 116 are interconnected through the orifice passage 72.

In the cab mount 110 of the present embodiment with this structure, active pressure fluctuations are induced in the upper fluid chamber 62 serving as the pressure-receiving chamber when the partition wall 60 moves in the axial direction due to vibration input in the axial direction, that is, relative movement of the inner shaft member 42 and the outer tube member 44 in the axial direction. Meanwhile, the lower fluid chamber 116 reduces or avoids pressure fluctuations since the wall portion of the lower fluid chamber 116 is partially constituted by the flexible film 112 so that swelling and compressive deformation inward and outward of the flexible film 112 readily permit changes in volume. The lower fluid chamber 116 constitutes an equilibrium chamber in which pressure fluctuations of the fluid are reduced in comparison with the upper fluid chamber 62 or kept generally unchanging even when vibration is input.

In this way, during vibration input in the axial direction, fluid flow between the upper fluid chamber 62 and the lower fluid chamber 116 through the orifice passage 72 arises based on relative pressure fluctuations induced therebetween.

The cab mount 110 with the fluid-filled tubular vibration-damping device 108 with the above structure is capable of exhibiting the effect same as the preceding first embodiment.

Figure 5:
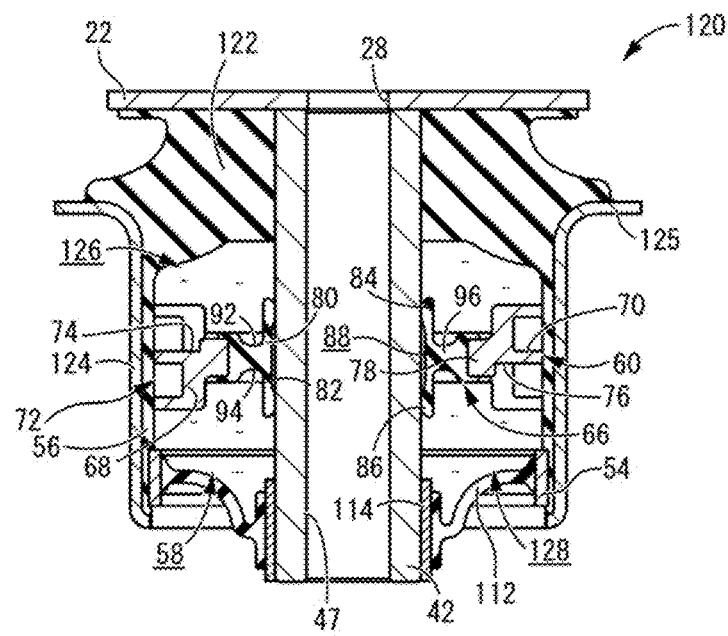
FIG. 5 is a longitudinal cross sectional view showing a fluid-filled tubular vibration-damping device as a third embodiment of the present invention.

Next, FIG. 5 shows an automotive cab mount 120 serving as the fluid-filled tubular vibration-damping device constructed according to the present invention as a third embodiment of the present invention. In the preceding first and second embodiments, the cab mount (12, 110) is constituted by the upper mount (14) being attached to the mounting portion of the vehicle body 18 from above and the lower mount (16, 108) serving as the fluid-filled tubular vibration-damping device of the present invention being attached to the mounting portion from below. On the other hand, just the lower mount could constitute the cab mount as the present embodiment. Therefore, in the present invention, it is not necessary to include the upper mount 14. Just the lower mount constructed according to the present invention could constitute the desired vibration-damping device.

Namely, in the preceding first and second embodiments, the upper mount (14) is provided above the vehicle body (18) and suffers almost all static load in the up-down direction as well as vibration load. In addition, the connecting rubber elastic body (20) which is an element of the upper mount (14) is provided as a separate element from the upper rubber elastic body (48) which covers the upper opening of the outer tube member (44). On the other hand, in the present embodiment, the two are formed to be a single rubber elastic body.

That is, in the present embodiment, an upper rubber elastic body 122 with a roughly thick annular shape is bonded to the outer peripheral surface of the upper end portion of the inner shaft member 42 and the inner peripheral surface of the upper opening of an outer tube member 124, so that the inner shaft member 42 and the outer tube member 124 are elastically connected to each other via the upper rubber elastic body 122 serving as the main rubber elastic body. Furthermore, the upper plate fitting 22, which is fixed to the upper end face of the inner shaft member 42, is bonded to the upper end face of the upper rubber elastic body 122. The upper rubber elastic body (main rubber elastic body) 122 is provided so as to elastically connect the outer peripheral surface of the inner shaft member 42 and the inner peripheral surface of the outer tube member 124 while connecting the upper plate fitting 22 and an outer flange 125 provided around the upper end of the outer tube member 124 in the axial direction.

On the other hand, the flexible film 112 serving as the lower rubber elastic body is attached to the lower opening of the outer tube member 124 as in the second embodiment. Due to the structure, the fluid sealing zone 58 is provided between the axially opposite upper rubber elastic body 122 and the flexible film 112, and the partition wall 60 is housed and disposed within the axially medial portion of the fluid sealing zone 58. Accordingly, an upper fluid chamber 126 serving as the pressure-receiving chamber is formed above the partition wall 60, whereas a lower fluid chamber 128 serving as an equilibrium chamber is formed below the partition wall 60.

As in the first and second embodiments, the cab mount 120 with this structure is installed on the vibration transmission path between the automotive cab housing and the vehicle body and is configured to support the cab housing in a vibration-damping manner. Specifically, for example, the fixing bolt is inserted through the borehole 47 of the inner shaft member 42 and the center hole 28 of the upper plate fitting 22 so that the cab mount 120 is installed on the cab housing, whereas the outer tube member 124 is inserted into a mounting hole formed in the vehicle body (18) from above so that the outer flange 125 is fixed to the peripheral edge of the upper opening of the mounting hole in a overlapped state.

The upper rubber elastic body 122 is compressively deformed due to vibration input in the axial direction, and the partition wall 60 is moved in the axial direction with respect to the inner shaft member 42. In association therewith, relative pressure fluctuations arise between the upper fluid chamber 126 and the lower fluid chamber 128. Therefore, vibration damping effect is exhibited due to the flow action such as resonance of the fluid flowing through the orifice passage 72.

Besides, the outer peripheral surface of the upper rubber elastic body 122 is exposed to the outer space between the upper plate fitting 22 and the outer flange 125 and has a roughly tapered shape decreasing its diameter as it goes upward. The lower face of the upper rubber elastic body 122 is exposed inside the upper fluid chamber 126 between the outer peripheral surface of the inner shaft member 42 and the inner peripheral surface of the outer tube member 124 and has a large-diameter recessed shape increasing its diameter as it goes radially outward and opening downward. Accordingly, tensile stress which arises when support load is input in the axial direction is configured to be reduced. Furthermore, pressure fluctuations induced in the upper fluid chamber 126 when vibration is input in the axial direction and hence the amount of fluid flow through the orifice passage 72 can be increased.

Therefore, also in the fluid-filled tubular vibration-damping device (cab mount) 120 of the present embodiment, the effect same as the first and second embodiments can be exhibited.

Above, we gave a detailed description of an embodiment of the present invention, but the invention shall not be construed as limited in any way to the specific disclosures in the embodiment and means for solving the problem.

For example, the radial dimension of the partition wall rubber 66 is modifiable according to the vibration-damping characteristics and spring rigidity required to the vibration-damping device. For example, by adjusting the projecting length of the inward convex portion 78 formed projecting from the inner peripheral surface of the orifice member 68, the effective radial length of the partition wall rubber 66 could be set appropriately.

Also, the structure, length, cross sectional area, or the like of the orifice passage 72 interconnecting the upper and lower fluid chambers 62, 64 are variable according to the required vibration damping characteristics. For example, an orifice passage could be formed so as to penetrate the radially medial portion of the orifice member in the axial direction.

Furthermore, the main rubber elastic body (including the upper rubber elastic body and the lower rubber elastic body) could be bonded by vulcanization to the inner shaft member.

In addition, although in the preceding third embodiment, the lower rubber elastic body is constituted by the flexible film 112 as in the second embodiment, it could be constituted by the rubber elastic body with a prescribed thickness and a roughly annular disk shape as in the first embodiment.

It is also to be understood that the present invention may be embodied with various other changes, modifications and improvements, which may occur to those skilled in the art, without departing from the spirit and scope of the invention defined in the following claims.

What is claimed is:

1. A fluid-filled tubular vibration-damping device comprising:
   an inner shaft member;
   an outer tube member;
   a main rubber elastic body that connects the inner shaft member and the outer tube member so as to provide a sealed zone filled with a non-compressible fluid between the inner shaft member and the outer tube member;
   a partition wall partitioning the sealed zone into axially opposite parts so as to provide two fluid chambers; and an orifice passage interconnecting the two fluid chambers, wherein an outer peripheral side of the partition wall is fixed to the outer tube member, an inner peripheral side of the partition wall is constituted by an annular partition wall rubber that is externally disposed around the inner shaft member in a movable manner in an axial direction, sealing tube parts are integrally formed with an inner peripheral portion of the partition wall rubber and project toward axially opposite sides, and fitting parts thicker than the sealing tube parts are integrally formed with projecting distal ends of the respective sealing tube parts and are externally fitted around the inner shaft member in a slidable manner.

2. The fluid-filled tubular vibration-damping device according to claim 1, wherein a gap is provided between an inner peripheral surface of the sealing tube parts and the inner shaft member.

3. The fluid-filled tubular vibration-damping device according to claim 1, wherein the partition wall before being externally disposed around the inner shaft member has such a shape in isolation that the sealing tube parts have a straight tube shape which extends in the axial direction with a generally unchanging transverse cross section, while projecting distal end edges of the sealing tube parts are made thicker toward the inner peripheral side so as to provide the fitting parts.

4. The fluid-filled tubular vibration-damping device according to claim 1, wherein the inner peripheral portion of the partition wall rubber includes groove-shaped recess parts respectively extending on axially opposite surfaces in a circumferential direction on an outer peripheral side of projecting portions of the sealing tube parts which project toward the axially opposite sides.

5. The fluid-filled tubular vibration-damping device according to claim 1, wherein an annular orifice member is bonded to an outer peripheral side of the partition wall rubber while the annular orifice member is secured fitting into an inner peripheral surface of the outer tube member, and the orifice passage interconnecting the two fluid chambers is provided by utilizing the orifice member.

6. The fluid-filled tubular vibration-damping device according to claim 5, wherein the orifice member includes an inward convex portion projecting peripherally inward from an axially medial portion thereof, and the partition wall rubber is bonded to the inward convex portion.

7. The fluid-filled tubular vibration-damping device according to claim 1, wherein the sealing tube parts formed on the axially opposite sides of the partition wall rubber have shapes identical with each other.

8. The fluid-filled tubular vibration-damping device according to claim 1, wherein the two fluid chambers provided on the axially opposite sides of the partition wall comprise pressure-receiving chambers in which mutually opposite positive and negative pressure fluctuations are configured to arise by the partition wall being moved in the axial direction during relative movement of the inner shaft member and the outer tube member in the axial direction.

9. The fluid-filled tubular vibration-damping device according to claim 1, wherein the fluid chamber provided on one axial side of the partition wall comprises a pressure-receiving chamber in which pressure fluctuations are configured to arise by the partition wall being moved in the axial direction during relative movement of the inner shaft member and the outer tube member in the axial direction, and the fluid chamber provided on another axial side of the partition wall comprises an equilibrium chamber whose wall portion is partially constituted by a flexible film such that pressure fluctuations are configured to be avoided during relative movement of the inner shaft member and the outer tube member in the axial direction.

* * * * *